April 10, 1928. F. E. KAUFFMANN Re. 16,928

HAT CLIPPING MACHINE

Original Filed Nov. 6, 1920 3 Sheets-Sheet 1

INVENTOR
Ferdinand E. Kauffmann
BY
Wm. H. Campbell
ATTORNEY

April 10, 1928.

F. E. KAUFFMANN

HAT CLIPPING MACHINE

Re. 16,928

Original Filed Nov. 6, 1920 3 Sheets-Sheet 2

INVENTOR
Ferdinand E. Kauffmann
BY
Wm H Lamfield
ATTORNEY

April 16, 1928.
F. E. KAUFFMANN
HAT CLIPPING MACHINE
Re. 16,928
Original Filed Nov. 6, 1920 3 Sheets-Sheet 3
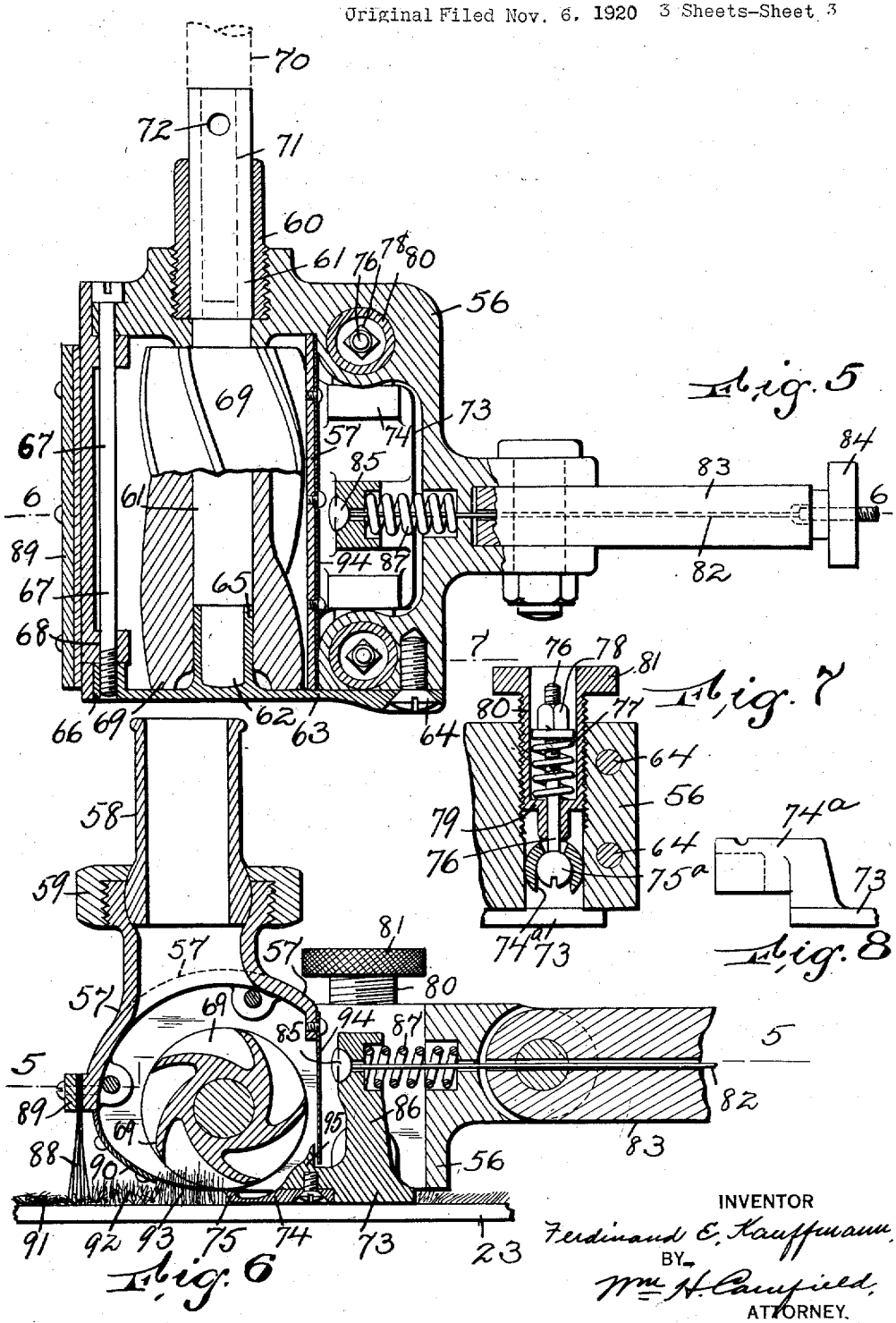
INVENTOR
Ferdinand E. Kauffmann.
BY
Wm. H. Canfield,
ATTORNEY.

Reissued Apr. 10, 1928. Re. 16,928

UNITED STATES PATENT OFFICE.

FERDINAND E. KAUFFMANN, OF RAHWAY, NEW JERSEY, ASSIGNOR TO DORAN BROTHERS, OF DANBURY, CONNECTICUT, A COPARTNERSHIP CONSISTING OF JAMES F. DORAN AND JOHN C. DORAN.

HAT-CLIPPING MACHINE.

Original No. 1,452,048, dated April 17, 1923, Serial No. 422,205, filed November 6, 1920. Application for reissue filed September 20, 1927. Serial No. 220,781.

This invention relates to an improved machine for clipping hats made of velour or similar material, such hats being formerly clipped as a hat body before it was formed with a brim, by passing it through machines that clipped it in flat form, or hand clippers have been slowly passed over the outside of the hat, in which case the degree of finish depended very much on the care or thoroughness with which the operator did the work.

The invention is designed to provide a machine which clips the hat body quickly over its entire surface, and is also designed to leave no portion thereof unclipped, the manual operation necessary being only such as will start or stop the machine and inserting or removing the hat.

The invention is designed to provide a machine of this kind in which clipping devices are brought to bear on a hat body which is supported so that it rotates, the parts being constructed so that they are movable relative to each other in order that the clipping devices may traverse the entire surface of the hat. I prefer to arrange the clipping devices so that one of them clips the crown, another the top of the brim and another the bottom of the brim.

The invention is further designed to provide a machine of this kind in which the arrangement of the parts is such that the machine is compact and small, and in which the clippings are carried from the machine, and also to provide for a raising of the nap of the velour or similar fabric so that an even cut is brought about during the clipping operation.

The invention further consists of certain details of construction which will be hereinafter more fully described and finally embodied in the claims.

Figure 1:
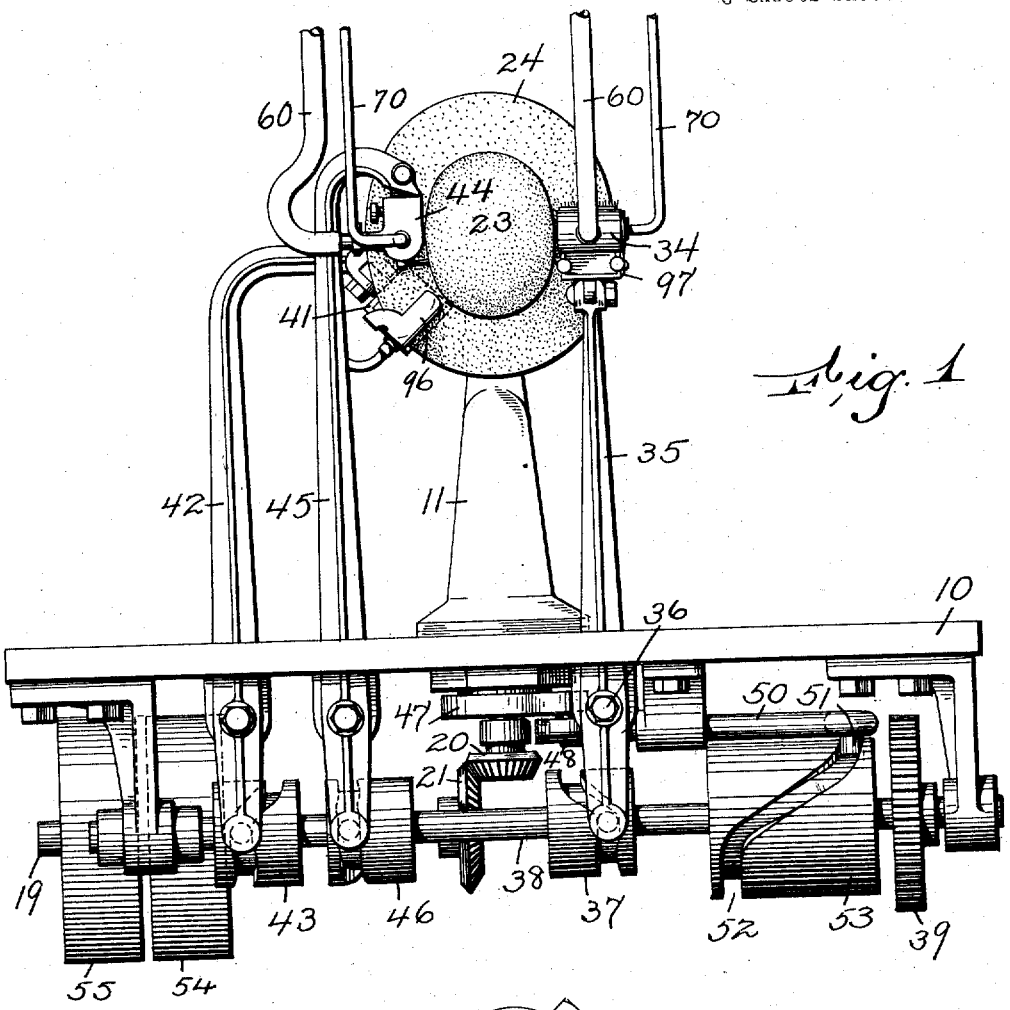
Figure 2:
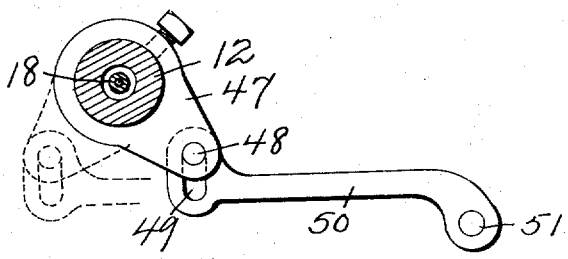
Figure 3:
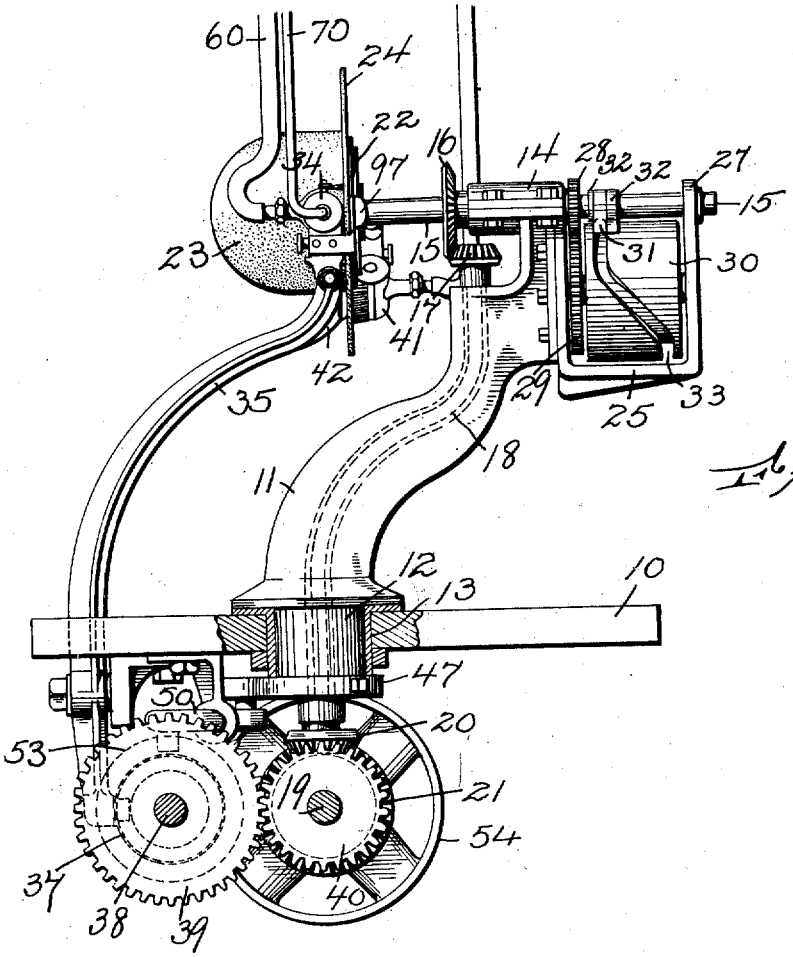
Figure 4:
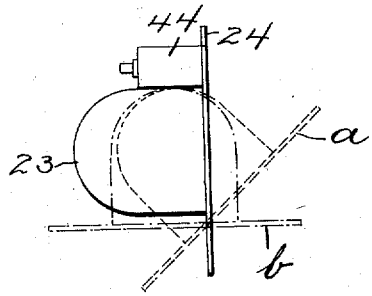

The invention is illustrated in the accompanying drawing, in which Figure 1 is a front view of one form of my improved machine, and Figure 2 is a detail of a portion of the mechanism that swings the hat support. Figure 3 is a side view of the machine shown in Figure 1. Figure 4 is a top view, somewhat diagrammatic, showing the manner in which the hat is swung so that all its parts come in contact with the clipping device. Figure 5 is a horizontal section of one of the clipping devices with a rotary cutter shown partly in elevation, such section being taken on the line 5—5 in Figure 6. Figure 6 is a section taken on line 6—6 in Figure 5. Figure 7 is a detail section taken on line 7 in Figure 5, and Figure 8 is an elevation of one side of the floor plate of the clipping device.

The machine as illustrated is supported on a table 10 which in turn rests on suitable legs or other supports, which are not shown. The hat supporting part of the machine is constructed to support the hat so that it can rotate, so that it can slide while it is rotating and can also be swung.

The form of structure illustrated comprises a standard 11 which is arranged with the hub 12 in the bearings 13 on the table so that it can be swung by means to be hereinafter more fully described, and has at the top thereof a bearing 14 in which the shaft 15 rotates, the shaft 15 being driven by gears 16 and 17 from a flexible shaft 18 which receives its power from the main shaft 19 by means of the gears 20 and 21. The block 22 is used to hold the hat 23 and is made so as to approximate the shape and size of the crown when it is shaped or taut. Since the hat is formed before it is clipped by this machine, the brim 24 extends transversely or laterally from the hat block, as will be clearly evident from Figures 1 and 3. The bracket 25 is secured to the standard 11, the bracket having on its extremity a bearing 27 for the end of the shaft 15, the shaft being secured by feathers or other means for permitting its sliding longitudinally relative to the gear 16 and also the gear 28, which is in mesh with the gear 29, which gear 29 is on a supplemental shaft with the cam 30, which cam 30 has a groove 33 which receives the roller 31 arranged between the collars 32, one at least of these collars being arranged so that it saddles the top of the cam and is thus prevented from rotating with the shaft 15.

A clipping means is mounted so as to traverse the hat, and in the machine illustrated comprises suitable clipping devices arranged so that they can be brought to bear on the hat to clip its surface, the preferred arrangement being to arrange one clipping device 34 so that it operates on the top of the brim 24, that is, the upper surface of the brim, and is adapted to be swung away from said brim and also brought back to the brim by the arm 35 pivoted at 36 and actuated by a cam 37 on the jack shaft 38, this jack shaft being driven from the main shaft by means of the gears 39 and 40.

A similar clipping device 41 is arranged at a place so that it will clip the bottom face of the brim and is mounted on an arm 42 actuated by a cam 43 on the jack shaft 38, and a clipping device 44 for the crown is mounted on arm 45 and is actuated by the cam 46. These clipping devices will be described in detail hereinafter.

The hub 12 of the standard 11 is provided with means for swinging it through an angle of at least ninety degrees, the form shown comprising a crank 47 having a pin 48 and resting in the slot 49 of the bar 50, which bar has a roller 51 on the end of it which is arranged in the slot 52 of the cam 53 on the jack shaft 38. The whole device is operated through suitable belting arranged over the fast pulley 54 and the loose pulley 55. Any suitable stopping and starting means, either manual or automatic, can be installed to regulate the starting and stopping of the machine.

The clipping devices are shown in detail in Figures 5–8 and comprise a casing 56 which has a top plate 57 which has an opening at the top and to which is attached an outlet pipe 58 by suitable means, such as a union connection 59, to which it attached a hose 60 (see Fig. 1), which is attached to any suitable source of suction so that the clippings from the fur are withdrawn and do not float about in the air to the detriment of the health of the operator.

The casing 56 is provided on one end with a bearing 60 for one end of the shaft 61. The other end of the shaft, as at 62, is arranged so that it is supported by a bearing plate 63, which bearing plate is substantially flat and is fastened by screws 64 on its rear end and has a bearing 65 for the shaft 61, and has a lug 66 into which the bolt 67 is screwed, the bolt 67 also passing through the bosses 68 of the top plate 57, so that all the parts are securely held together.

The plate 63, with its substantially flat formation, permits the use of the cutter close up to a corner, for instance at the point where the brim is attached to the crown. In addition to this it leaves no marks on the crown of the hat where this side of the cutter bears on it, this form of plate permitting the end of the rotary cutter 69 to extend nearly to the outside edge of the casing.

The shaft 61 is operated by means of a suitable flexible shafting 70 which preferably has its end 71 fastened in the end of the shaft by means of a screw or other fastening placed in the hole 72. A rocking plate 73 has secured to its front end a cutter bar 74, which cutter bar has its front edge 75 adapted to be engaged by the blades of the rotary cutter 69 to clip the material of the hat, and to compensate for wear on the cutter and cutter plate the rocking plate 73 is adjustable in bearings, which bearings in turn are adjustable. For this purpose the rocking plate 73 is provided with bosses 74[a] on its ends, these being recessed each to receive a ball 75[a] which permits the boss, and consequently the rocking plate, to rock on the ball, the stem 76 of the ball being supported by a spring 77, the tension of which is adjustable by means of the nut 78 screw-threaded on the stem 76, the lower end of the spring abutting on the bottom 79 of a screw-threaded sleeve 80 having a suitable head or finger piece 81.

The rocking plate can be designed so that its cutting plate has its cutting edge properly positioned relative to the rotary cutter 69 by means of a strand 82 which extends through the supporting element 83, which can be either a handle or one of the arms 35, 42 or 45, and is provided on its end with a nut 84. On the other end it has a head 85 placed in the post 86 of the rocking plate 73, and a spring 87 holds the rocking plate in its adjusted positions, but with a resilience which makes it possible to give the end of the cutter plate 74 a fine adjustment as to its pressure against the rotary cutter.

I prefer to provide means for roughing up the fur, one means comprising a set of steel or similar spring wires 88 fastened by a strip 89 or by other means to the front of the frame, and a plate 90 extends down from the bottom of the top plate to nearly the bottom of the machine to provide only sufficient opening for the strands of the velour to be clipped.

It will be evident from Figure 6 that the material, as at 91, is closely matted very often and it is sufficiently scraped by the wires 88 to loosen it and to raise it to a considerable extent, as at 92, but the suction of air entering the casing, due to its being exhausted through the pipe 60, causes the velour to stand up, as at 93, so that a substantially even cut is provided over the entire surface of the hat. To insure such suction of air through the opening at the bottom of the casing I provide a plate 94, usually made of spring brass and extending from one side of the frame to the other, which bears against or substantially close to a shoulder 95 on the front part of the rocking plate.

It will be evident that as the cutting edge 75 wears down the rocking plate 73 must be readjusted, which can be done by turning the sleeve 80, which is screw-threaded in the casing, and this without altering the pressure of the spring 77, which spring insures at all times a proper and tight seating of the bosses 74 and consequently of the rocking plate in the frame. It will be evident from an inspection of Figures 1 and 3 that the flexible shafts 70 and the pipes 60 can be provided with sufficient slack so that the arms 35, 42 and 45 can be swung without affecting the operation of these parts.

The operation of the device is as follows: When the machine is ready to start, the cams 37, 43 and 46 are in such position as to swing the clipping means down away from the hat, or rather the hat supporting block 22, and then the hat 23 is put in place. As the machine starts these cams operate to swing the clipping devices into position, those embracing the brim having guide plates, as 96, on the clipping device 41, and as 97 on the clipping device 34, these plates being preferably made of brass and having curved ends so as to receive the edge of the brim into the open mouth and then guide it between the cutter plates 74 and each of its guide plates, these guiding plates also acting to hold the brim into position while it is being cut. As these clipping devices take position the hat is rotated by means of the mechanism hereinbefore described for at least one complete rotation, and then the cams 37 and 43 operate to swing the brim clipping devices 34 and 41 away from the hat, since the clipping of the brim is now completed.

The clipping device 44 that is clipping the crown remains in position and the cam 30 now begins to slide the hat backward, since the shaft 15 is pulled backward, and as this backward movement begins the cam 53 operates to swing, through the crank 47, the standard 11 so that the hat slowly assumes the position shown at *a* in Figure 4, that is, it is half way around, having turned about forty-five degrees, the turning point being substantially in line with the center of the clipping device 44, and this continues until the hat arrives at the position shown at *b* in Figure 4, which is at right angles to the position the hat originally was in. As this is clipped the cam 46 acts to swing the clipping device 44 away from the hat and the cam 56 operates to swing the arm 11 back to its normal position and the cam 30 acts to push the shaft 15 and the hat that it supports back to its normal position, and the hat can be removed from the machine and another hat substituted for a repetition of the above described steps.

It will be understood that minor details can be altered, and that parts can be differently assembled and proportioned, without departing from the scope of the invention.

I claim:

1. A hat clipping machine comprising a hat support including a block to hold a hat with its crown taut and shaped, a clipping device, and means for moving the parts so that the clipping device traverses the entire crown of the hat.

2. A hat clipping machine comprising a hat support including a block to hold a hat with its crown taut and shaped and its brim extended, a clipping means, means for rotating the block, means for moving the clipping means, and means for actuating the hat support so that the clipping means traverses the crown and both faces of the brim.

3. A hat clipping machine comprising a hat support including a block to hold a hat with its crown taut and shaped, a clipping means, and automatic means for moving the parts so that the clipping means traverses the hat including the tip of the crown.

4. A hat clipping machine comprising a rotatable hat support including a hat block to hold a hat with its crown shaped and its brim extended, a clipping device for the crown, a clipping device for both faces of the brim, means for moving said devices into and out of contact with the hat, and means for rotating the block and the support so that the clipping devices traverse the hat.

5. A hat clipping machine comprising a rotatable support, a longitudinally slidable hat holding block on said support, means for sliding the block, means for rotating the support, and clipping devices disposed so as to traverse the hat when the support is rotated and the block is slid.

6. A hat clipping machine comprising a rotatable support, a slidable hat holding block on said support, means for rotating the support, means for longitudinally sliding the block, arms swingable toward and from the hat, clipping devices on the arms, and operative connections between the support, the block and the arms to cause the clipping devices to traverse the hat to clip the fur on the entire outside surface of the hat.

7. A hat clipping machine comprising a support, a block on the support for holding a hat, a clipping device bearing on the crown, a clipping device bearing on the top of the brim, a clipping device bearing on the bottom of the brim, and operative connections for moving the parts so that the clipping devices traverse parts of the hat, whereby the whole surface is clipped in one operation.

8. A hat clipping machine comprising a means for supporting a hat so that it is rotatable and slidable, a clipping device bearing on the crown, and means for rotating and sliding the hat so that as it rotates it is slid, and means for swinging the hat support so that all the crown is presented to the clipping device.

9. A clipping device comprising a frame, a shaft in the frame, a rotary cutter mounted on the shaft, a thin bearing plate on one side of the frame, in which frame one end of the rotary shaft is supported, whereby the cutter can be operated on the brim of a hat and closely adjacent to the crown.

10. A clipping device comprising a frame, a shaft in the frame, one wall of the frame being thin and having an inwardly projecting recessed bearing to receive the shaft, and a cutter on the shaft and recessed to receive the bearing.

11. A clipping device comprising a frame having an integral side wall, a thin side wall having a recessed bearing on its inner face, a top plate having an opening for the attachment of an exhaust pipe, the top plate having lugs thereon, a screw passing through the integral wall of the frame and the lugs of the top plate and being in screw-threaded engagement with the end of the thin side plate, a bearing in the fixed wall, a shaft passing through the bearing and having its end in the recessed bearing of the thin side plate, and a cutter on said shaft, the cutter being recessed to receive the last mentioned bearing.

12. A clipping device comprising a frame, a rotary cutter mounted therein, a rocking plate, a cutter plate fastened to the front of the rocking plate and against which the rotary cutter is adapted to bear to operate, screw-threaded sleeves in the frame, a stem in the sleeves, bearings on the rocking plate, said bearings and the ends of the stems being constructed so that they permit a rocking movement of the rocking plate, a spring abutting on the bottom of each sleeve, and means on each stem for adjusting the tension of the spring.

13. In a hat clipping machine, in combination, a device adapted to support a hat block having a hat thereon, the hat having been stretched and shaped to have a crown of approximately the shape desired in the finished hat and the block fitting snugly within the crown of the hat, a clipping device, means adapted to rotate one of said devices substantially about the axis of the hat block, and means adapted relatively to move said two devices during said rotation so that said clipping device traverses the entire crown of the hat.

14. In a hat clipping machine, in combination, means adapted to support a hat block having a hat thereon, the hat having been stretched and shaped to have a crown of approximately the shape desired in the finished hat and the block fitting snugly within the crown of the hat, means adapted to rotate said hat block with said hat thereon, a clipping device, and means for relatively moving said rotating hat block and said clipping device so that said clipping device traverses the crown of said rotating hat in a path extending between the brim and the tip of the hat.

15. In a hat clipping machine, in combination, means adapted to supoprt a hat block having a hat thereon, the hat having been stretched and shaped to have a crown of approximately the shape desired in the finished hat and the block fitting snugly within the crown of the hat, means adapted to rotate said hat block with said hat thereon, a clipping device, means for supporting said clipping device to operatively engage the surface of said hat, means mounting one of said supporting means for a combined swinging movement about an axis substantially transverse to the axis of rotation of the hat and movement in a direction substantially lengthwise of the axis of rotation of the hat, and means for giving said supporting means said movement to cause said clipping device to traverse the crown of the hat.

16. In a hat clipping machine, in combination, a rotatable support adapted to support a hat block having a hat thereon, the hat having been stretched and shaped to have a crown of approximately the shape and size desired in the finished hat and the hat block fitting snugly within the crown of the hat, a clipping device adapted to clip the surface of said hat comprising a rotating cutter and a cutter bar positioned to coact with the blades of said rotating cutter, means for rotating said support with said hat block and said hat thereon, means for supporting said clipping device for movement into and out of operative engagement with the hat crown, means for relatively moving said hat support and said clipping device support during rotation of said hat to cause said clipping device to traverse the crown of said rotating hat in a path extending between the tip and the brim thereof with said cutter bar bearing against the hat and with said coacting rotating cutter and cutter bar continually operative upon the hat surface, and means for driving said rotating cutter, said means being adapted to permit said relative movements.

17. In a hat clipping machine, in combination, means adapted to support a hat block having a hat thereon, means for positively rotating said hat block and said hat, a movable arm mounted adjacent said support, a clipping device mounted upon said arm for movement therewith into and out of engagement with the crown of said hat, said clipping device comprising a casing, a rotary clipper mounted in said casing, a cutter bar mounted on said casing to coact with the blades of said rotary cutter, means connected to said casing for carrying away the clippings from said cutter, means for relatively moving said hat support and said clipper-carrying arm to cause said clipping device to traverse the entire surface of the crown of said hat with said coacting rotating cutter and cutter bar continually operative upon the hat surface, and means for driving said rotating cutter adapted to permit said movements.

18. In a hat clipping machine, in combination, means adapted to support a hat block having a hat thereon, means for positively rotating said hat block and said hat, a clipping device comprising a rotary cutter and a cutter bar coacting therewith, means for supporting said clipping device in operative engagement with the crown of said hat, means for driving said rotary cutter, means for relatively moving said clipping device and said hat support to cause said clipping device to traverse the entire crown of said hat with said coacting rotating cutter and cutter bar continually operative upon the hat surface, and means independent of said hat-rotating means operative upon the hat surface in advance of the operative edge of the cutter bar for loosening up the nap on the hat surface.

19. In a hat clipping machine, in combination, means for supporting a hat block having a hat thereon, means for positively rotating said hat block and said hat, a clipping device comprising a driven cutter and a cutter bar coacting therewith, means for driving said cutter, means mounting said clipping device for movement into and out of engagement with the hat surface, means for relatively moving said hat support and said clipping device to cause said clipping device to traverse the hat surface with said cutter and cutter bar operative upon the hat surface to clip the same, and means adapted to separate the hat and said clipping device upon completion of the clipping operation.

20. In a hat clipping machine, in combination, means for supporting a hat block having a hat thereon, means for rotating said hat block and said hat therewith, a clipping device comprising a rotating cutter and a cutter bar coacting therewith, means for supporting said clipping device in position to clip the brim of said rotating hat, the axis of said rotating cutter extending transversely of the brim and said rotating cutter and coacting cutter bar operatively engaging the brim surface, and means for supporting the brim on the side thereof opposite to said clipping device.

21. In a hat clipping machine, in combination, means for supporting a hat block having a hat thereon, means for rotating said hat block and said hat therewith, a clipping device comprising a rotating cutter and a cutter bar coacting therewith, means for supporting said clipping device in position to clip the brim of said rotating hat, the axis of said rotating cutter extending transversely of the brim and said rotating cutter and coacting cutter bar operatively engaging the brim surface, means for moving said clipping device into and out of said operative position, and means for guiding the brim into proper engagement with said clipping device as the latter is moved into operative position.

22. In a hat clipping machine, in combination, means for supporting a hat block having a hat thereon, means for rotating said hat block and said hat, a clipping device comprising a rotating cutter and a cutter bar coacting therewith, said cutter bar being adapted to bear against the surface being clipped, means for driving said cutter, means mounting said clipping device for movement into and out of operative engagement with the crown of said rotating hat, said clipping device in its operative position engaging the rotating hat crown so that the axis of said rotating cutter is substantially transverse to the direction of rotative movement of the hat surface, means for giving said hat support and said clipping device a relative movement including a combined swinging movement about an axis substantially transverse to the axis of rotation of the hat and movement in a direction substantially lengthwise of the axis of rotation of the hat to cause said clipping device to traverse the crown in a path extending between the brim and the tip thereof, and means for holding said clipping device in said operative position during said traverse.

23. In a hat clipping machine, in combination, means for supporting a hat block having a hat thereon, means for rotating said hat block and said hat, a clipping device comprising a rotating cutter and a cutter bar coacting therewith, said cutter bar being adapted to bear against the surface being clipped, means for driving said cutter, means mounting said clipping device for movement into and out of operative engagement with the crown of said rotating hat, said clipping device in its operative position engaging the rotating hat crown so that the axis of said rotating cutter is substantially transverse to the direction of rotative movement of the hat surface, means for giving said hat support and said clipping device a relative movement including a combined swinging movement about an axis substantially transverse to the axis of rotation of the hat and movement in a direction substantially lengthwise of the axis of rotation of the hat to cause said clipping device to traverse the crown in a path extending between the brim and the tip thereof, means for holding said clipping device in said operative position during said traverse, and means for carrying away the clippings removed by said clipping device, said last means and said means for driving said rotating cutter being arranged to permit said movement of said clipping device into and out of operative position and said relative movements causing said traverse.

24. In a hat clipping machine, in combination, means for supporting a hat block having a hat thereon, the hat having been stretched and shaped to have a crown of approximately the shape desired in the finished hat, the hat block fitting snugly within said crown, means for rotating said hat block and said hat, a clipping device comprising a rotating cutter and a cutter bar coacting therewith, said cutter bar being adapted to bear against the surface being clipped, means for driving said cutter, means mounting said clipping device for movement into and out of operating engagement with the crown of said rotating hat, said clipping device in its operative position engaging the rotating hat crown so that the axis of said rotating cutter is substantially transverse to the direction of rotative movement of the hat surface, means for relatively moving said hat support and said clipping device to cause said clipping device to traverse the crown in a path extending between the brim and the tip thereof, means for holding said clipping device in said operative position during said traverse, and means moving with said clipping device for operating upon the hat surface to loosen up the nap thereof.

25. In a hat clipping machine, in combination, means for supporting a hat block having a hat thereon, the hat having been stretched and shaped to have a crown of approximately the shape desired in the finished hat and the hat block fitting snugly within said crown, means for rotating said hat block and said hat, a clipping device comprising a rotating cutter and a cutter bar coacting therewith, said cutter bar being adapted to bear against the surface being clipped, means for driving said cutter, means mounting said clipping device for movement into and out of operative engagement with the crown of said rotating hat, said clipping device in its operative position engaging the rotating hat crown so that the axis of said rotating cutter is substantially transverse to the direction of rotative movement of the hat surface, means for giving said hat support and said clipping device a relative movement including a combined swinging movement about an axis substantially transverse to the axis of rotation of the hat and movement in a direction substantially lengthwise of the axis of rotation of the hat to cause said clipping device to traverse the crown in a path extending between the brim and the tip thereof, means for holding said clipping device in said operative position during said traverse, means for carrying away the clippings removed by said clipping device, said last means and said means for driving said rotating cutter being arranged to permit such movement of said clipping device into and out of operative position and said relative movements causing said traverse, and means independent of said hat-rotating means operating upon the hat surface for loosening up the nap thereof.

In testimony whereof I have signed my name to this specification this 15th day of September, 1927.

FERDINAND E. KAUFFMANN.